United States Patent [19]
Arnold et al.

[11] 3,941,362
[45] Mar. 2, 1976

[54] CLAMPING DEVICE, IN PARTICULAR A MACHINE VISE

[75] Inventors: Franz Arnold, Kempten; Peter Preisenhammer, Kempten-Lenzfried, both of Germany

[73] Assignee: Saurer-Allma GmbH, Allgaeuer Maschinenbau, Kempten, Germany

[22] Filed: Sept. 9, 1974

[21] Appl. No.: 504,533

[30] Foreign Application Priority Data
Sept. 17, 1973 Germany............................ 3337118

[52] U.S. Cl. .................................. 269/32; 269/228
[51] Int. Cl.² ............................................ B25B 1/14
[58] Field of Search ............. 269/20, 24, 32, 27, 228

[56] References Cited
UNITED STATES PATENTS

| | | | |
|---|---|---|---|
| 2,335,743 | 11/1943 | Cross | 269/32 |
| 2,443,775 | 6/1948 | Olson | 269/32 |
| 3,484,094 | 12/1969 | Arnold | 269/32 |
| 3,603,579 | 9/1971 | Odom | 269/32 |
| 3,650,522 | 3/1972 | Wermuth | 269/228 |
| 3,807,721 | 4/1974 | Arnold | 269/228 |

FOREIGN PATENTS OR APPLICATIONS

| | | | |
|---|---|---|---|
| 1,900,835 | 10/1970 | Germany | 269/24 |

*Primary Examiner*—Harold D. Whitehead
*Assistant Examiner*—Robert C. Watson
*Attorney, Agent, or Firm*—Woodhams, Blanchard and Flynn

[57] ABSTRACT

A clamping device having a hollow spindle screwable in a stationary vise part and a pressure rod axially slidable in the hollow spindle for exerting clamping pressure. A mechanical or hydraulic power amplifier is arranged in a cylindrical housing connected to the hollow spindle. The secondary or driven member of the power amplifier acts onto a pressure rod. The primary member of the power amplifier is acted upon by a driving element which itself is arranged in a compressed air cylinder adjoining the power amplifier housing. An additional mechanical or hydraulic power amplifier is arranged in the compressed air cylinder between the compressed air piston and the aforementioned primary member.

13 Claims, 7 Drawing Figures

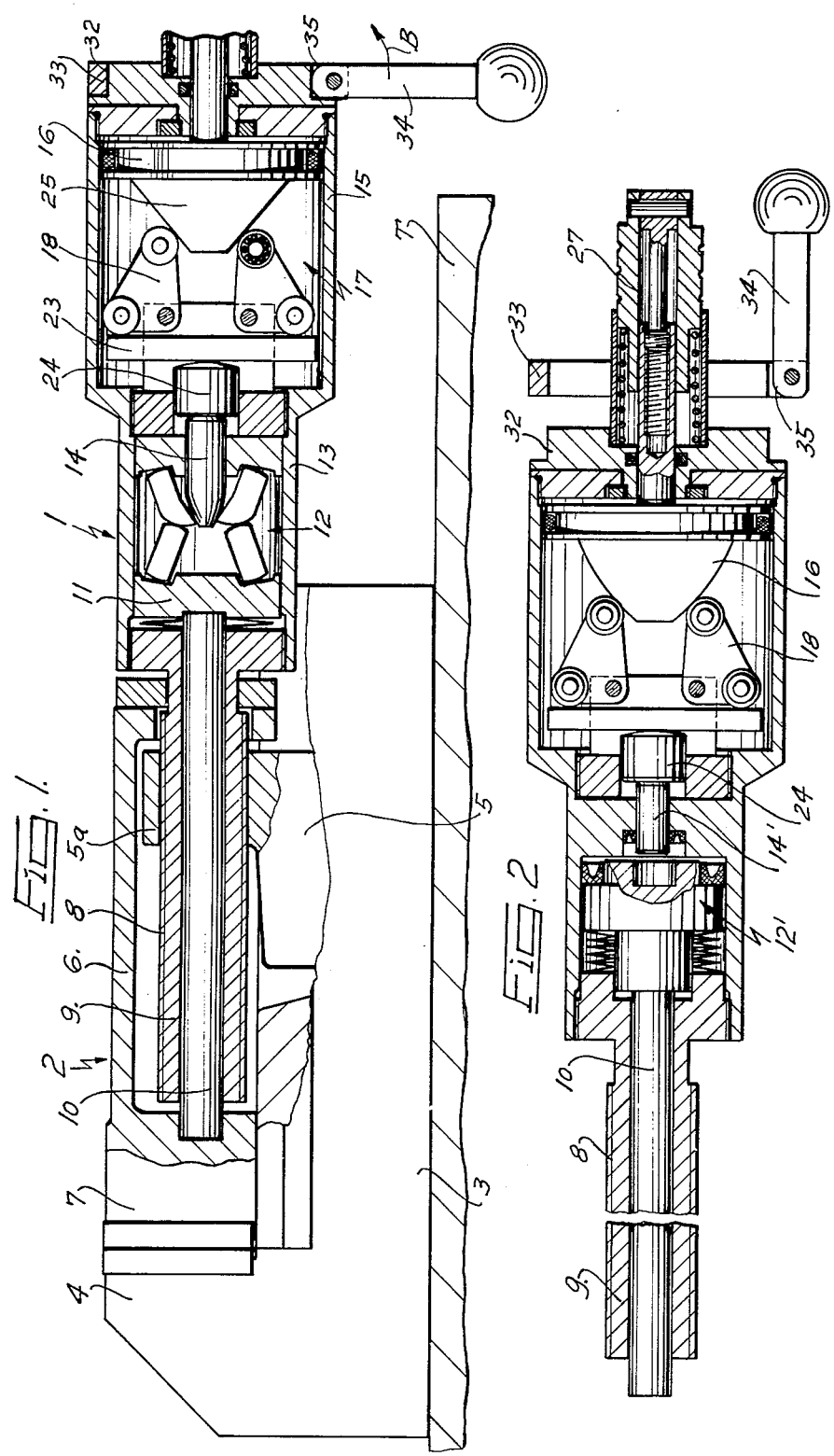

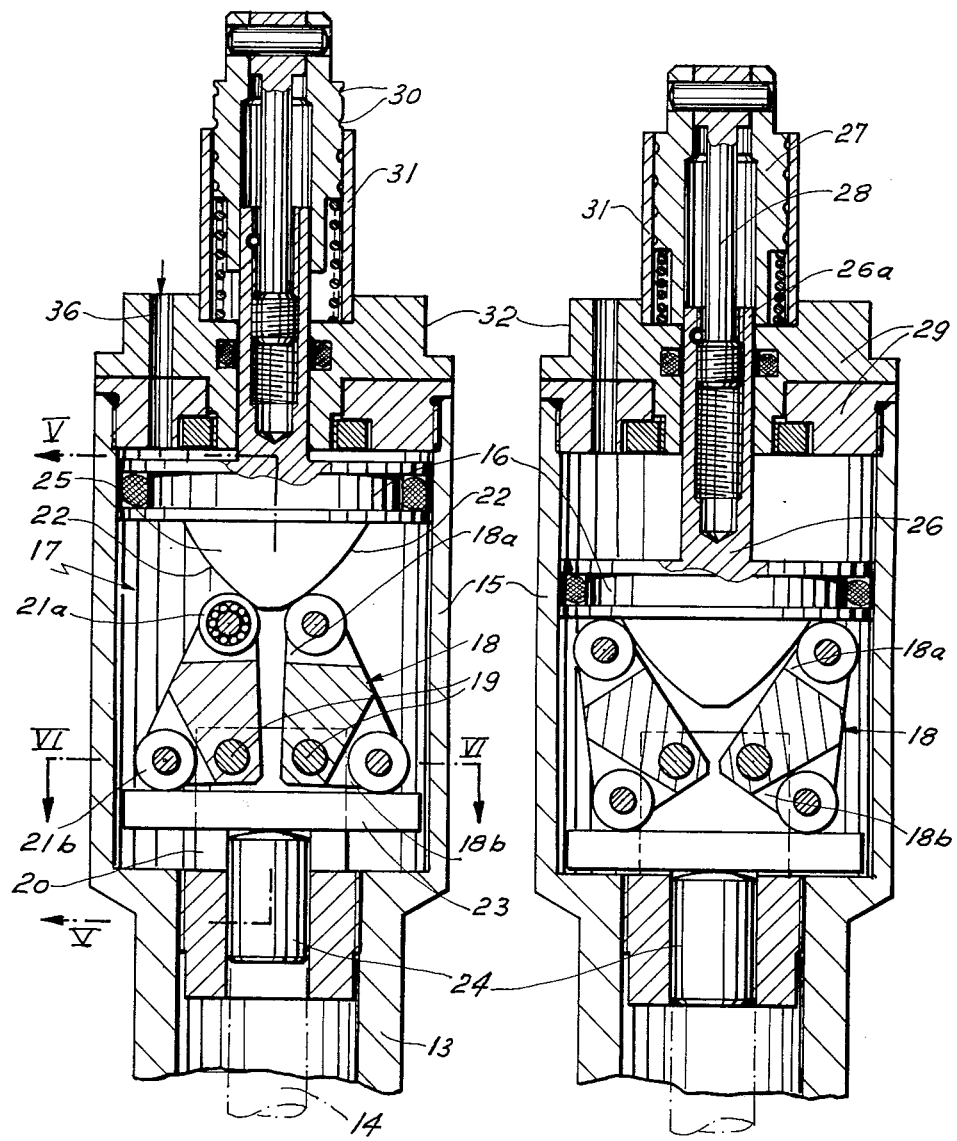

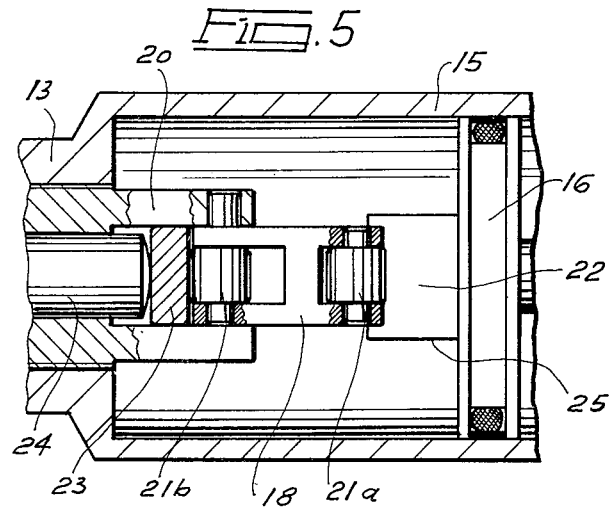
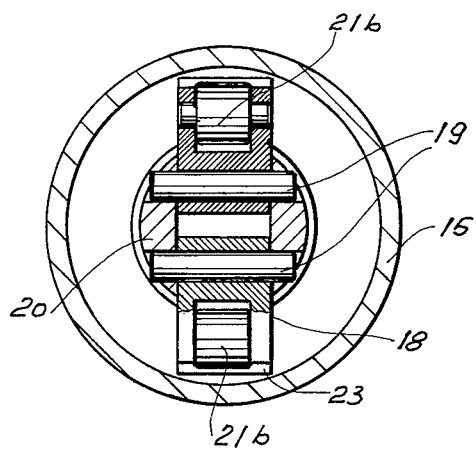

CLAMPING DEVICE, IN PARTICULAR A MACHINE VISE

FIELD OF THE INVENTION

The invention concerns a clamping device, in particular a machine vice, having a hollow spindle screwable in the stationary vice part, a pressure rod axially slidable in the said hollow spindle for exerting the clamping pressure, a mechanical or hydraulic power amplifier arranged in a cylindrical housing connected to the hollow spindle, the secondary member of the said power amplifier acting on the pressure rod and the primary member of the power amplifier being under the force effect of a driving element, a compressed-air piston being used as driving element, which itself is arranged in a compressed-air cylinder adjoining the power amplifier housing.

BACKGROUND OF THE INVENTION

In such clamping devices (known for example from German Pat. Specification No. 1,289,799), there is provided as driving element as a rule a driving spindle operated by means of a crank handle, the forward end of the driving spindle acting on the primary member of the power amplifier. This power amplifier may be a hydraulic power amplifier equipped with a differential piston system.

The latter comprises a primary piston having a small diameter and a secondary piston having a large diameter, the primary piston plunging into the cylinder chamber of the coaxially arranged secondary piston. Mechanical power amplifiers in this domain are also known, operating mostly on the toggle lever principle, the primary member acting on the toggle joints of a number of toggle lever pairs supported by their free end on the secondary member.

Although such clamping devices have been successful in practice, they are still in need of improvement. The driving spindle of these known clamping devices has in fact still to be turned by hand which takes time and is fatiguing for the operator.

To simplify the operation, it is also already known in clamping devices of another type to prefer, as driving element, a compressed-air cylinder, which itself is arranged in a cylinder adjoining the power amplifier housing. Since, on the one hand, the working pressure in the compressed-air mains in the finishing shops is comparatively low, while on the other hand the working pressure for actuating the primary member is comparatively high, the compressed-air piston has to have a comparatively large diameter. Owing to this large diameter, the known compressed-air clamping device cannot be used in many cases for reasons of space, in particular its use in machine vices is limited.

It is the object of the invention to provide a compressed-air operated clamping device of the aforesaid kind, which even with low working pressure has a high clamping pressure and a small external diameter, as well as being of simple construction.

This is achieved according to the invention by providing in the compressed-air cylinder, between the compressed-air piston and the primary member, a second mechanical or hydraulic power amplifier.

This second hydraulic or mechanical power amplifier enables the compressed-air piston to be kept comparatively small, even for a low operating pressure, so that the compressed-air cylinder in its external diameter is not larger or is only insignificantly larger than the cylindrical housing of the first power amplifier. This small external diameter enables the clamping device to be fitted in machine vices in which it is important to make the latter of as flat a construction as possible. Owing to the second power amplifier, the new clamping device can be connected to the usual compressed-air mains in workshops. Since for its operation, it is merely necessary to open or close valves, the clamping device can be operated effortless, and is therefore especially suitable in mass production. Despite its small external diameter, a considerable clamping pressure can be obtained with the new clamping device.

In further development of the invention, the mechanical power amplifier has at least one lever, preferably however two levers arranged symmetrically of the piston axis, each having two lever arms of different lengths, the longer lever arm bearing against the piston and the shorter lever arm acting on the primary member, the levers being mounted pivotally in an abutment connected to the cylindrical housing or to the compressed-air cylinder. This mechanical power amplifier is extremely simple in construction and permits a power amplification of the force produced by the compressed-air piston in the ratio of about 1:4.

The external diameter of the compressed-air cylinder is then only insignificantly larger than the cylindrical housing of the first power amplifier. All the levers and their bearings are arranged in the front part of the compressed-air cylinder, where they are protected from dust and spray water.

The second hydraulic power amplifier, as is known per se, may also consist of a primary piston of small diameter and a secondary piston of large diameter, the primary piston plunging into the cylinder chamber of the coaxially arranged secondary piston. This hydraulic power amplifier is still simpler in its construction, but compared with the mechanical modification has the drawback that the hydraulic fluid has to be replenished after a lengthy operational period.

Advantageously, in the hydraulic construction, the compressed-air piston and the secondary piston have the same diameter and are mounted spaced apart in one cylinder in common, an annular partition, prevented from axial displacement, being provided in the cylinder between the two pistons, the primary piston passing through the said partition. This construction is particularly simple and is also particularly space-saving, since the external diameter of the compressed-air cylinder corresponds to that of the cylindrical housing.

BRIEF DESCRIPTION OF THE DRAWINGS

Further details of the invention are explained more particularly in the following with reference to a number of embodiment examples represented in the accompanying drawings, in which:

FIG. 1 shows in longitudinal section a machine vice with the new clamping device a mechanical first power amplifier, FIG. 2 shows in longitudinal section the clamping device with a hydraulic first power amplifier, FIG. 3 shows in part longitudinal section the first embodiment example in the inoperative position, FIG. 4 shows the same in the clamping position, FIG. 5 is a part section on the line V-V of FIG. 3, FIG. 6 is a cross-section on the line VI—VI of FIG. 3.

DETAILED DESCRIPTION

Figure 7:
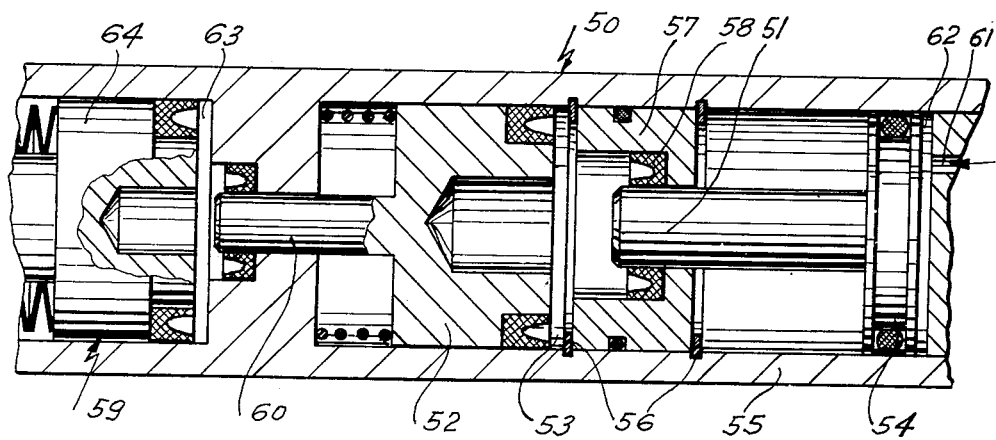
FIG. 7 shows an embodiment example in part section with hydraulic first and second power amplifiers.

In the drawings, 1 denotes the entire clamping device, preferably used on a machine vice 2. The stationary jaw 4 is rigidly secured to the base-plate 3 of this machine vice 2. The bearing bracket 5 carrying the spindle nut 5a is adjustable in different positions, also on the base-plate 3. The slide 6, mounted for sliding in the direction A on the base-plate, carries the movable jaw 7. The hollow spindle 9 of the clamping device 1, which spindle is provided with the external screwthread 8, is adapted to be screwed in the spindle nut 5a.

The hollow spindle 9 has in known manner a pressure rod 10 slidably mounted in it, being supported with its front end on the movable jaw 7 and exerting the clamping pressure on this jaw. Acting on the rear end of the pressure rod 10 is the secondary enlarged head member 11 of a mechanical power amplifier 12, known per se. This is a toggle lever power amplifier, as disclosed in a similar embodiment by German Pat. No. 1,289,799.

Instead of this toggle lever power amplifier 12, however, any other mechanical power amplifier may be used, or a hydraulic power amplifier 12' as shown in FIG. 2. The power amplifier 12 is mounted in a cylindrical housing 13. Its primary member is provided with the reference 14.

Adjoining the power amplifier housing 13 is a compressed-air cylinder 15, in which is arranged the compressed-air piston 16. A second mechanical power amplifier 17 is provided between the compressed-air piston 16 and the primary member 14. In the embodiment example shown in FIGS. 1 to 6, this mechanical power amplifier 17 comprises two bell-crank levers 18 arranged symmetrically of the piston axis having lever arms 18a and 18b of different lengths. The bell-crank levers are pivotal on pins 19 which in their turn are mounted in an abutment 20 screwed to the cylindrical housing 13. To reduce friction, rollingly mounted rollers 21a and 21b are provided on the ends of the lever arms 18a and 18b. The two lever arms 18a and 18b are arranged approximately at right angles to each other with respect to the pivot pin 19. The roller 21a provided on the end of the long lever arm 18a lies on a wedge surface 22 extending obliquely to the piston axis, while the roller 21b of the short lever arm 18b is supported on a pressure plate 23. The latter in turn lies loosely on the spherical end of a pressure bolt 24. It can therefore rock slightly with respect to the axis of the pressure bolt, whereby production tolerances in the two bell-crank levers are balanced out and equal forces are exerted on the two bell-crank levers.

In the embodiment examples shown in FIGS. 1 to 6, the wedge surfaces 22 are divergent with respect to the piston 16.

The pressures exerted by the rollers 21a on the wedge surfaces 22 are directed towards the piston axis and thus cancel each other out. The wedge 25 is thus not subjected to any bending forces. Advantageously, the wedge surfaces 22 are slightly curved, their inclination to the piston axis decreasing towards the piston 16. The clamping pressure is thereby additionally increased when the piston 16 assumes its foremost position.

A clamping pressure of different values is required according to the nature of the workpiece and the nature of the machining. The clamping pressure depends on the position of the compressed-air piston 16 at the time. To adjust the clamping pressure, therefore, on the free end 26a of a piston rod 26 of the compressed-air 16, the said piston rod projecting from the compressed-air cylinder 15, there is provided a stop sleeve 27 surrounding the piston rod. This sleeve is axially screwable with respect to the piston rod 26. To attain an axial length as small as possible, it is advantageous for this purpose to connect the free end of the stop sleeve 27 fast for rotation to a spindle 28 screwable in the interior of the piston rod 26. When the piston 16 is acted upon by compressed air, the front end 27a of the sleeve 27 is applied in clamping position against a cover 29 closing the compressed-air cylinder 15. FIG. 4 shows the most advanced position of the compressed-air piston 16, i.e., the position corresponding to maximum clamping force. If the sleeve 27 is screwed in a direction towards the piston 16, as shown in FIG. 3, then on the admission of compressed air, its front end 27a is applied earlier to the cover 29 and therefore the clamping pressure is limited to a lower value.

For adjustment of the clamping pressure, the stop sleeve 27 has on its external periphery a number of marking rings 30 spaced apart in the axial direction. Furthermore, an indicating sleeve 31 surrounding the stop sleeve and secured to the cover 29 is provided.

In the inoperative position of the clamping device, the free end of the stop sleeve 27 projects more or less from the said indicating sleeve according to the axial adjustment as shown in FIG. 3. The adjusted clamping pressure can be read off from the number of working rings projecting from the indicating sleeve 31 in the inoperative position. The indicating sleeve also serves for checking whether the clamping device is clamped or unclamped. In fact, as shown in FIG. 4, the stop sleeve 27 always enters in its full length the indicating sleeve 31, irrespective of what clamping pressure has been adjusted.

Furthermore, there is advantageously provided on the free end of the compressed-air cylinder 15, or a cover 29 closing it, a collar 32 serving to set on a driving ring 33 surrounding it. The driving ring is provided with a pivotally mounted handle 34 carrying on its bearing end an eccentric 35 co-operating with the collar 32. The function of this driving ring is described in the following explanation of the mode of operation of the novel clamping device.

For clamping a workpiece, the slide 6 by rotation of the hollow spindle 9 is first of all adjusted coarsely to the workpiece dimensions. This adjustment can be made by rotation of the compressed-air cylinder by grasping the compressed-air cylinder 15 directly or rotating the handle 34. It may happen, however, that for reasons of space, rotation of the handle 34 is not possible because the latter, for example, strikes against the machine table T. In this case, the handle is turned in the direction B into the position shown in FIG. 2.

The eccentric 35 is thereby released from the collar 32 and the driving ring 33 can be withdrawn from the collar. If coarse adjustment of the slide 6 has been made, the movable clamping jaw 7 is situated at a distance of about 2 to 3 mm from the workpiece. The driving ring 33 is now put on the collar 32 again and the handle 34 is turned back into its clamping position. The eccentric 35 bears against the collar 32 and thereby clamps the driving ring 33 firmly on the collar. If now the driving ring is rotated by means of the handle 34 through 180° about the principal axis of the entire clamping device, the hollow spindle 9 is screwed in the spindle nut 5a and the movable clamping jaw 7 bears against the workpiece with a relatively small pressure. No appreciable expenditure of force is required for turning the handle 34. A valve, not shown, is now opened and compressed air is let into the compressed-air cylinder 15 through the opening 36. This compressed air is at the pressure of about 6 atm usual in works compressed-air pipes. The compressed-air forces the piston 16 forward until its movement is limited by the stop sleeve 27. The bell-crank levers 18 are rotated outwardly by the wedge surfaces 22, whereby a pressure is exerted on the pressure plate 23. This pressure is transmitted by the pressure bolt 24 to the primary member 14 of the power amplifier 12. By means of the mechanical second power amplifier 17, the pressure produced by the compressed-air piston is amplified by about 1:4. Power amplification again occurs in the first power amplifier 12. The secondary member 11 of this first power amplifier presses on the pressure rod 10 and thus presses the movable clamping jaw 7 against the workpiece. In the clamped position, the compressed-air piston and the members of the second power amplifier 17 which are associated with it have the position shown in FIG. 4.

If the clamping pressure is to be released, the cylinder space is vented through a valve, not shown. By means of the springs 37 of the first power amplifier as well as the spring 38 engaging the stop sleeve, all the parts of the clamping device are returned to the position shown in FIG. 3. The clamping pressure is terminated, but the movable jaw 7 is still applied with a slight pressure against the workpiece. If, by operation of the handle 34, the hollow spindle is turned back through 180°, the movable clamping jaw 7 moves away from the workpiece by about 2 to 3 mm and the workpiece can be removed unimpeded.

The embodiment example shown in FIG. 2 differs merely by the use of a known hydraulic power amplifier 12' as first power amplifier instead of the mechanical power amplifier 12. All the other parts of the clamping device are the same, so that repeated description is unnecessary. The primary member 14' of the first power amplifier 12' in this case is the primary piston.

In the embodiment example shown in FIG. 7 the second power amplifier 50 is in the form of a hydraulic power amplifier. It comprises a primary piston 51 of small diameter and a secondary piston 52 of large diameter, the primary piston plunging into the cylinder chamber 53 of the coaxially arranged secondary piston 52. Advantageously, the piston rod of the compressed-air piston 54 forms at the same time the primary piston 51 of the second power amplifier 50. The compressed-air piston 54 and the secondary piston 52 of the second power amplifier 50 expediently have equal diameters and are arranged spaced apart in a common cylinder 55. Between the two pistons 52 and 54 there is provided an annular partition 57 prevented by retaining rings 56 from axial displacement, through which partition the primary piston passes with the interposition of a suitable seal 58. If the first power amplifier 59, as shown in FIG. 2, is similarly in the form of a hydraulic power amplifier, the piston rod of the secondary piston 52 of the second power amplifier 50 may form at the same time the primary piston 60 of the first power amplifier. The mode of operation of this clamping device, in so far as concerns the coarse adjustment and approach of the movable clamping jaw to the workpiece by rotation of the hollow spindle is the same as in the embodiment example mentioned at the commencement.

If the movable clamping jaw 7 lies against the workpiece, compressed air is led into the chamber 62 through the bore 61, whereby the compressed-air piston 54 is shifted to the left. The primary piston 51 plunging into the cylinder chamber 53 filled with hydraulic liquid shifts the secondary piston 52 of the first power amplifier by a slight amount also to the left. The primary piston 60 of the first power amplifier 59, which primary piston is connected to the secondary piston 52, plunges into the cylinder chamber 53 filled with hydraulic fluid, and now shifts the secondary piston 64 to the left, this piston in its turn exerting the clamping pressure on the pressure rod 10.

We claim:

1. A spindle device for use in a mechanical clamping device having a fixed jaw and a movable jaw, comprising:

a threaded spindle nut secured to said fixed jaw and being spaced therefrom;

hollow spindle means rotatably mounted in said spindle nut, said hollow spindle means including a unitary threaded spindle having an axially extending hole through the center thereof threadedly engaging said threaded spindle nut and a hollow housing member;

manually operable means connected directly to said hollow housing member for applying a positive torque to said hollow housing member to effect a rotation of said hollow housing member and said threaded spindle in said spindle nut and further effect thereby an axial movement of said hollow spindle means relative to said spindle nut and toward and away from said fixed jaw;

means for preventing a relative rotation between said manually operable means and said hollow housing member during a use of said manually operable means;

a pressure rod reciprocally mounted in and coaxial with said hole in said threaded spindle and movable with said hollow spindle means, an end of said pressure rod engaging said movable jaw, an opposite end of said pressure rod being located in said hollow housing member and having a head member thereon whereby an application of torque to said manually operable means will effect a rotation thereof about an axis common to said axis of said threaded spindle and an adjustment of said movable jaw toward said fixed jaw to clamp a workpiece therebetween;

external fluid pressure operated force applying means mounted in said hollow housing member adjacent said manually operable means for applying an axially directed force inside said hollow housing member, said fluid pressure operated force applying means having axially reciprocal output means thereon; and first and second series connected power amplification means symmetrically arranged in said hollow housing member about said axis of said threaded spindle and rotatable therewith about said axis for transmitting the axial force from said output means to said head member on said pressure rod, said first and second power amplifier means providing a two-stage amplification in the axial force from said output means.

2. A device according to claim 1, wherein said fluid pressure operated force applying means comprises a cylinder and a piston reciprocally mounted therein, said output means being secured to said piston.

3. A device according to claim 2, wherein said output member is a wedge;
wherein said first power amplification means includes a pair of levers arranged symmetrically of the piston axis of said piston and each having two lever arms of different lengths, a long lever arm bearing on said wedge connected to the piston and a shorter lever arm bearing on a first output member, the levers being pivotally mounted in said hollow housing member.

4. A device according to claim 3, including a pressure plate provided between said short lever arms and said first output member which loosely engages a spherical end on said first output member.

5. A device according to claim 2, wherein said second power amplification means is a hydraulic power amplifier and comprises a reciprocally movable first primary piston and a first secondary piston having a first cylinder chamber therein, said first primary piston including first means being received into said first cylinder chamber.

6. A device according to claim 5, wherein said output means is a piston rod; and
wherein said first power amplification means is a hydraulic power amplifier and comprises a reciprocable movable second primary piston and a second secondary piston having a second cylinder chamber therein, said second primary piston including second means being received into said second cylinder chamber;
wherein said second primary piston has a third cylinder chamber therein receiving said piston rod.

7. A device according to claim 6, wherein said piston of said force applying means and said secondary piston of said second power amplification means have equal diameters and are axially spaced apart in said hollow housing member, there being provided in said housing member between said piston and said secondary piston an annular partition secured against axial displacement and having means thereon for permitting a passing of said first primary piston therethrough.

8. A device according to claim 2, including an axially adjustable stop sleeve secured to said piston in said force applying means and movable therewith, said stop sleeve being movable into and out of engagement with an end cover of said hollow housing member adjacent said force applying means.

9. A device according to claim 8, wherein the free end of said stop sleeve is fixedly connected to a threaded spindle received in the interior of a threaded piston rod on the remote side of said piston from said output means.

10. A device according to claim 8, wherein said stop sleeve has on its external periphery a number of axially spaced marking rings and a further indicating sleeve surrounding said stop sleeve and secured to said end cover, from which indicating sleeve, in an inoperative position, the free end of the stop sleeve projects in response to said axial adjustment of said stop sleeve.

11. A device according to claim 1, wherein said manually operable means includes a collar and a drive ring mounted thereon and being coaxial with said hollow spindle means, said drive ring having a handle secured thereto and having an eccentric engaging said collar to effect a securing of said drive ring to said collar.

12. A device according to claim 3, wherein said second power amplification means is a mechanical power amplifier for amplifying the force from said first output member and applying it to said head on said pressure rod.

13. A device according to claim 3, wherein said second power amplification means is a hydraulic power amplifier and comprises a reciprocally movable first primary piston in response to movements of said first output member and a first secondary piston having a first cylinder chamber therein, said first primary piston including first means being received into said first cylinder chamber, said first primary piston having a second cylinder chamber therein receiving said first output member.

* * * * *